(12) United States Patent
Pereira et al.

(10) Patent No.: US 8,854,948 B2
(45) Date of Patent: *Oct. 7, 2014

(54) FAULT TOLERANCE AND SYNCHRONOUS FAILOVER FOR BROADCAST VIDEO ACROSS THE NETWORK

(75) Inventors: Michael Pereira, Milpitas, CA (US); Fang Wu, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 775 days.

This patent is subject to a terminal disclaimer.

(21) Appl. No.: 12/904,240

(22) Filed: Oct. 14, 2010

(65) Prior Publication Data

US 2011/0080826 A1   Apr. 7, 2011

Related U.S. Application Data

(63) Continuation of application No. 11/265,903, filed on Nov. 2, 2005, now Pat. No. 7,817,535.

(51) Int. Cl.
*H04L 12/28* (2006.01)
*H04N 21/6405* (2011.01)
*H04N 21/24* (2011.01)
*H04J 1/16* (2006.01)
*H04L 29/06* (2006.01)
*H04L 29/14* (2006.01)

(52) U.S. Cl.
CPC ............ *H04N 21/6405* (2013.01); *H04L 65/80* (2013.01); *H04N 21/2404* (2013.01); *H04N 21/2405* (2013.01); *H04L 69/40* (2013.01); *H04L 65/4076* (2013.01)
USPC ............................ 370/216; 370/252; 370/390

(58) Field of Classification Search
USPC .......................................... 370/252, 216, 390
See application file for complete search history.

(56) References Cited

U.S. PATENT DOCUMENTS

| | | | |
|---|---|---|---|
| 5,537,408 A | 7/1996 | Branstad et al. | |
| 5,652,749 A | 7/1997 | Davenport et al. | |
| 5,790,543 A | 8/1998 | Cloutier | |
| 5,835,493 A * | 11/1998 | Magee et al. | 370/395.62 |
| 5,905,713 A * | 5/1999 | Anderson et al. | 370/241 |
| 5,966,387 A | 10/1999 | Cloutier | |
| 6,366,970 B1 | 4/2002 | Wolff et al. | |
| 6,650,719 B1 | 11/2003 | Baker | |
| 6,654,421 B2 * | 11/2003 | Hanamura et al. | 375/240.26 |
| 6,839,865 B2 | 1/2005 | Gould et al. | |
| 7,061,942 B2 | 6/2006 | Noronha et al. | |
| 7,307,945 B2 | 12/2007 | Gerdisch et al. | |
| 7,489,742 B2 | 2/2009 | Saha et al. | |
| 2004/0218633 A1 | 11/2004 | Burzynski | |
| 2006/0146823 A1 * | 7/2006 | Ding | 370/390 |
| 2006/0209989 A1 * | 9/2006 | Saha et al. | 375/326 |
| 2007/0058627 A1 | 3/2007 | Smith et al. | |

\* cited by examiner

*Primary Examiner* — John Pezzlo
(74) *Attorney, Agent, or Firm* — Patterson + Sheridan, LLP

(57) ABSTRACT

A system and a method are disclosed for detecting a multicast stream fault condition at a variety of points within a digital broadcast video distribution system. In addition, a method of seamless switchover from a primary to a redundant multicast stream is provided.

20 Claims, 13 Drawing Sheets

| Syntax | No. of bits | Mnemonic |
|---|---|---|
| adaptation_field() { | | |
|   adaptation_field_length | 8 | uimsbf |
|   if (adaptation_field_length > 0) { | | |
|     discontinuity_indicator | 1 | bslbf |
|     random_access_indicator | 1 | bslbf |
|     elementary_stream_priority_indicator | 1 | bslbf |
|     PCR_flag | 1 | bslbf |
|     OPCR_flag | 1 | bslbf |
|     splicing_point_flag | 1 | bslbf |
|     transport_private_data_flag | 1 | bslbf |
|     adaptation_field_extension_flag | 1 | bslbf |
|     if (PCR_flag=='1') { | | |
|       program_clock_reference_base | 33 | uimsbf |
|       reserved | 6 | bslbf |
|       program_clock_reference_extension | 9 | uimsbf |
|     } | | |

*FIG. 6*

| Syntax | No. of bits | Mnemonic |
|---|---|---|
| transport_packet(){ | | |
|   sync_byte | 8 | bslbf |
|   transport_error_indicator | 1 | bslbf |
|   payload_unit_start_indicator | 1 | bslbf |
|   transport_priority | 1 | bslbf |
| 810—PID | 13 | uimsbf |
|   transport_scrambling_control | 2 | bslbf |
|   adaptation_field_control | 2 | bslbf |
| 820—continuity_counter | 4 | uimsbf |
|   if (adaptation_field_control=='10' \|\| adaptation_field_control=='11') { | | |
|     adaptation_field() | | |
|   } | | |
|   if (adaptation_field_control=='01' \|\| adaptation_field_control=='11') { | | |
|     for (i=0; i<N; i++){ | | |
|       data_byte | 8 | bslbf |
|     } | | |
|   } | | |
| } | | |

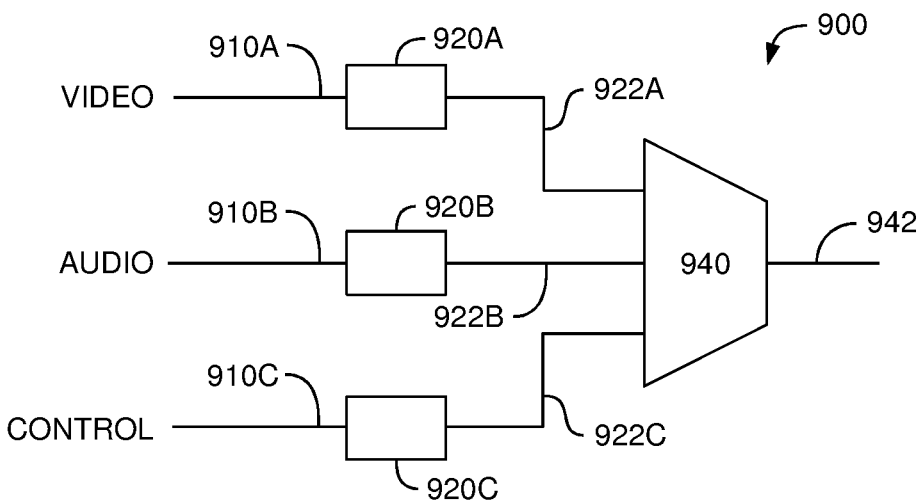
FIG. 9A
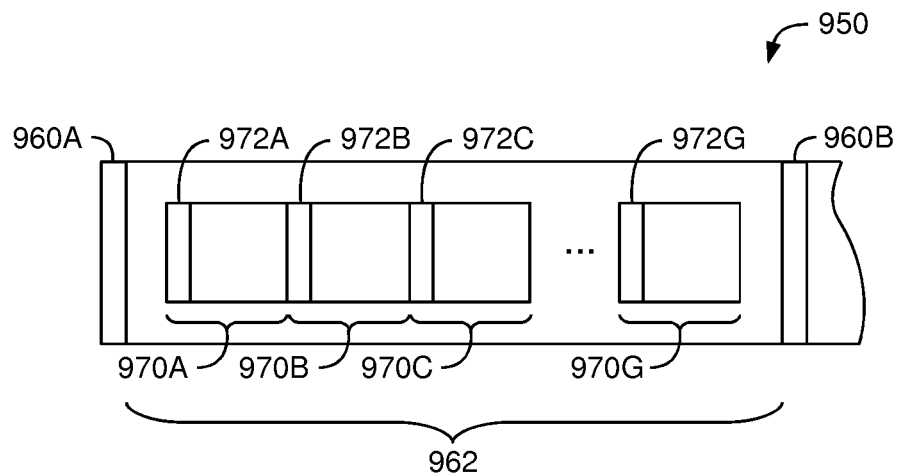
FIG. 9B
| PID | TYPE |
|---|---|
| X | VIDEO |
| Y | AUDIO |
| Z | CONTROL |
FIG. 9C

FAULT TOLERANCE AND SYNCHRONOUS FAILOVER FOR BROADCAST VIDEO ACROSS THE NETWORK

CROSS REFERENCE TO RELATED APPLICATIONS

This is a continuation of U.S. patent application Ser. No. 11/265,903 filed Nov. 2, 2005, now U.S. Pat. No. 7,817,535 which is incorporated herein by reference.

This application is also related to U.S. patent application Ser. No. 10/969,113 filed Oct. 20, 2004, entitled, "System and Method for Fast Start-Up of Live Multicast Streams Transmitted Over a Packet Network," the contents of which are hereby incorporated by reference.

TECHNICAL FIELD

The present invention generally relates to the field of video broadcast over digital networks, and more specifically to providing fault tolerance for video broadcasting over digital networks.

BACKGROUND

Developments in telecommunications technology have expanded the availability of information services to the home. For example, previously, television and telephone services were each carried into the home by dedicated lines. However, it is now possible for telephone operators (telcos) to provide video content, and for cable operators to provide telephone service. Furthermore, the development of the Internet has enabled new alternatives for provision of information and service to the home. These advancements have brought about new competitive pressures. In particular, competition has driven requirements for quality-of-service (QOS) and Quality of Experience (QOE).

One aspect of QOS/QOE is fault tolerance. Should service be interrupted due to a component failure or other interruption in the transmission path, it is critical that service be restored with minimum or no disruption to the user. In the case of a video broadcast, the user should experience a minimum number of skipped, repeated or distorted video frames, as well as a minimum disruption in sound.

Broadcast video may be sourced from terrestrial broadcast feeds or satellite downlinks, and can be digitized and distributed via packet based networks as multiple "multicast streams." These streams are delivered over a high-speed link, typically Gigabit Ethernet, to an edge or first hop router. The edge router advertises the multicast group(s) to the network. In conventional systems, such a router can detect overall link failures, e.g., loss of all multicast groups, loss of overall synchronization etc. When such failures occur, the edge router can control "failover," e.g., switching or switchover to an available redundant path. However, conventional approaches cannot detect failures on individual multicast streams, and thus cannot make failover decisions on a stream basis. Thus, there is a possibility that individual stream failures can go undetected, and therefore unmitigated. This can result in substantial disruption to the viewer, with consequential negative implications to the service provider.

From the above, there is a need for a system and method to detect individual multicast stream failures in digital broadcast video systems, and to allow for rapid failover to a redundant source.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 6 illustrates a transport stream adaptation field;

FIG. 8 illustrates a transport packet structure;

FIG. 9a illustrates a method of multiplexing video, control and audio information;

FIG. 9b illustrates a multiplex stream including video, control and audio information;

FIG. 9c illustrates association of program identifiers with types of information;

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Overview of Network Architectures for Broadcast Video Distribution

Figure 1:
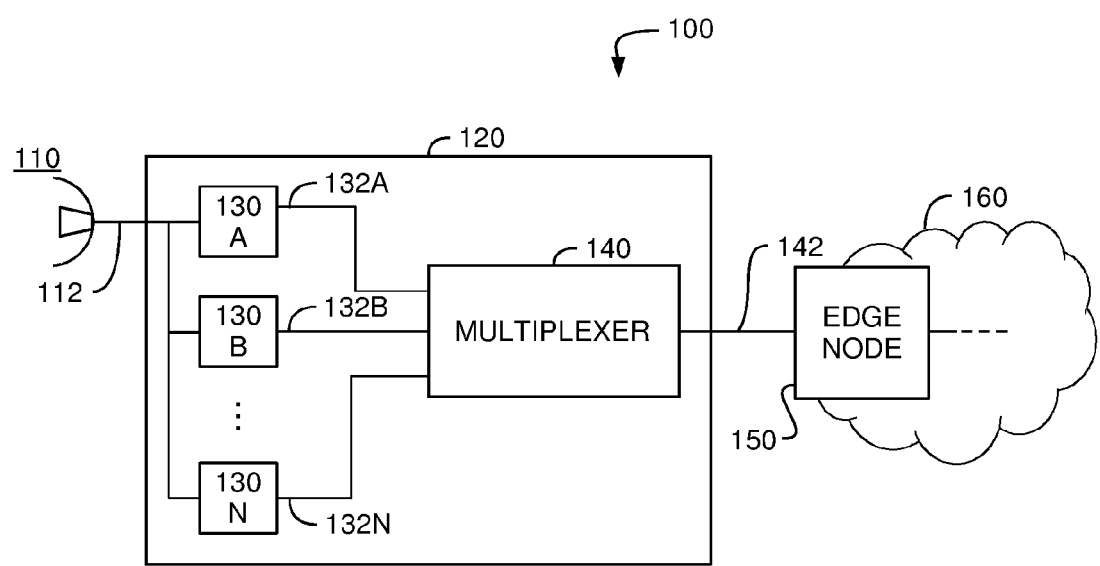
FIG. 1 is a schematic illustration of a broadcast video distribution system.

FIG. 1 shows a concept for broadcasting program content over a network. Antenna 110 receives a signal 112 from, e.g., a satellite or terrestrial broadcast source. Signal 112 potentially comprises hundreds of individual programs, sometimes referred to as channels, which may be frequency multiplexed. Each channel comprises video and audio content, and may further comprise data and control signaling. Accordingly, hereinafter, references to "video broadcast" or "broadcast video" will be understood to refer to communication of any combination of video, audio, data and control information. At the physical layer, signal 112 may comprise a combination of analog and digital waveforms.

Encoder 120 comprises a number of receiver-digitizers 130. Each receiver-digitizer 130 is capable of selecting a particular channel and outputting one or more bitstreams 132 that encode the video, audio, control and other information present on the selected channel. The encoding method may perform bandwidth compression, for example, MPEG-2 for video content and MPEG-3 (MP3) for audio content. Signals 132 are referred to as Transport Stream (TS) packets.

Signals 132 are multiplexed by multiplexer 140 into a single information stream 142, which may be of any convenient protocol and physical format, such as User Datagram Protocol (UDP) over gigabit Ethernet. Such streams may be referred to as Single MPEG Program Transport Stream (SPTS) Multicast Streams, hereinafter "streams." Stream 142 is then introduced into a network 160 by a first network element 150, typically referred to as an edge node. Edge node 150 may be any type of network element appropriate to network 160, e.g., an edge router. The functionality of edge routers and other types of edge nodes is well known in the art and need not be elaborated here. Network 160 may be any network designed to distribute the information in stream 142 to users, and may be an open network such as the Internet, or a closed/proprietary network, sometimes referred to as a "walled garden network." Closed networks may generally be implemented by telcos, cable operators or other types of service providers. Several representative network configurations and stream failure detection and mitigation mechanisms pertinent to the invention are next discussed.

Figure 2:
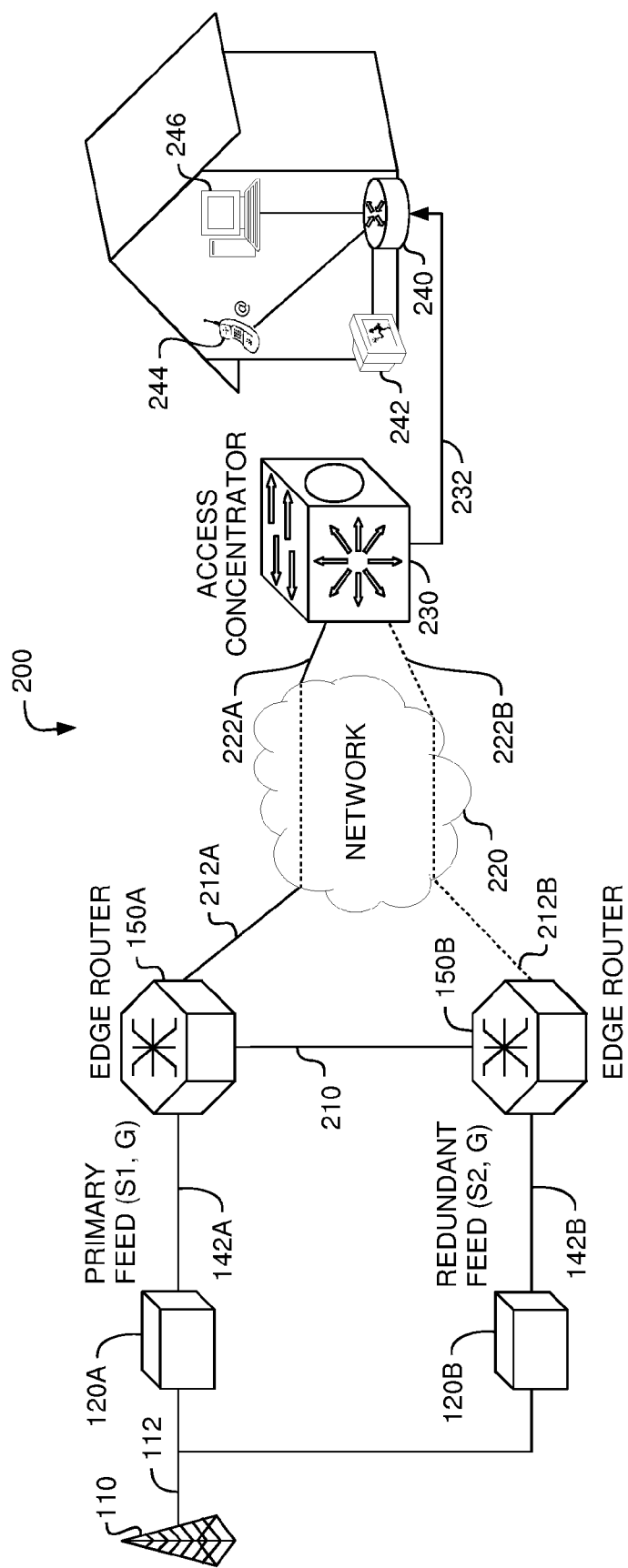
FIG. 2 illustrates a broadcast video distribution system with encoder and edge router redundancy.

FIG. 2 illustrates a broadcast video distribution system that comprises a closed network 220 and incorporates encoder and edge router redundancy. Antenna 110 delivers signal 112 to multiple encoders 120 as discussed above. While two encoders 120 are shown for convenience, it should be understood that the principles discussed below are applicable to configurations having any number of encoders. Encoders 120 produce streams 142. Streams 142 may generally be characterized by the notation (S,G), where S denotes a multicast encoder address, and G denotes an output group multicast address. In the configuration shown, streams 142 are each generated by a different encoder, but, are otherwise identical. Thus, stream 142a, also referred to as the primary feed, is characterized as (SI,G), while stream 142b, also referred to as the redundant feed, is characterized as (S2,G).

According to one embodiment of the present invention, normally, i.e., absent a fault condition, edge router 150a (the "primary edge router") introduces stream 212a into network 220, while edge router 150b (the "redundant edge router") is inactive. Normally, network 220 delivers a corresponding stream 222a to access concentrator 230. Access concentrator 230 may be any of a variety of networking devices capable of switching, e.g., selecting, one of streams 222. For example, access concentrator 230 may be a an edge switch or router in the case of fiber to the home (FTTH), or a digital subscriber line access multiplexer (DSLAM) in the case of DSL.

Normally, access concentrator 230 selects stream 222a and outputs a corresponding stream over link 232. Link 232 may comprise any of a variety of physical formats, e.g., copper wires or FTTH. Link 232 connects to one or more devices 240, each associated with an individual home. Devices 240, referred to variously as customer premises equipment (CPE), residential gateways (RG), etc., may comprise DSL modems, cable modems, or other types of terminating equipment. Devices 240 provide one or more standard interfaces, for example, 10/100baseT that may serve a variety of information appliances within the home. Such appliances may include, for example, television set-top boxes 242, internet phones 244 or personal computers 246.

According to one embodiment of the present invention, edge routers 150 communicate via intercommunication link 210. When primary edge router 150a detects a stream failure condition, it notifies redundant edge router 150b accordingly via intercommunication link 210. Redundant edge router 150b then becomes active and outputs stream 212b. Redundant edge router 150b then also advertises the multicast group that it has begun to supply. Access concentrator 230 thereafter selects the resultant new source stream 222b. The configuration of FIG. 2 advantageously features full redundancy through the input to access concentrator 230. However, upon a fault condition, delay is incurred as a consequence of the time required for inter-router fault notification and access concentrator switching.

Variations of the configuration of FIG. 2 are possible. For example, according to another embodiment, both of streams 212a/222a and 212b/222b are maintained active. In this variation, stream 142a and 142b may be designated (S1,G1) and (S2,G2), respectively. In this variation, stream fault detection and failover are provided by access concentrator 230, and thus notification of fault status over inter-router communication link 210 is unnecessary. Advantageously, failover delay due to inter-router notification and propagation thereof from the edge router to the access concentrator is eliminated. Access concentrator 230 receives redundant streams from multiple sources, and may detect failures across many streams being transported over multiple gigabit Ethernet links. Consequently, access concentrator 230 is preferably informed of the primary/redundant stream pairings, and, more specifically, the full multicast address –(S,G) of each primary and redundant stream.

Figure 3:
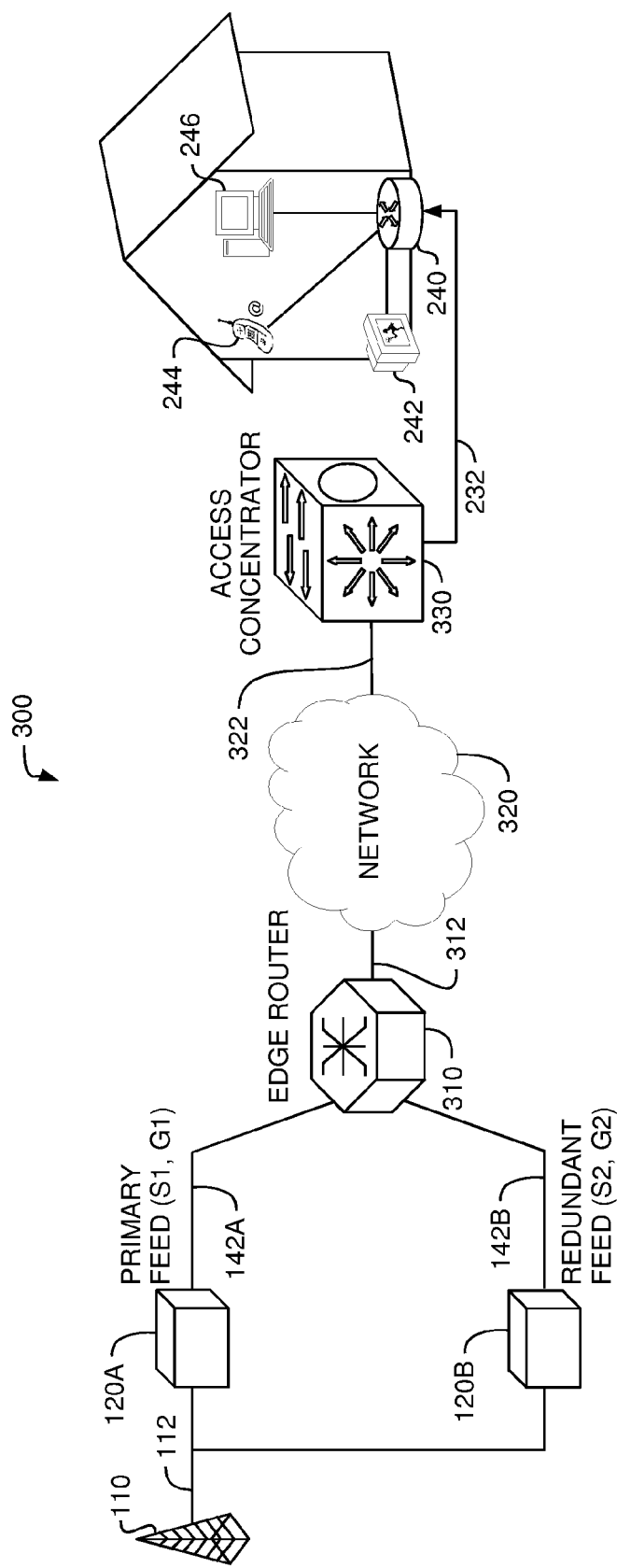
FIG. 3 illustrates a broadcast video distribution system with encoder redundancy.

FIG. 3 illustrates a broadcast video distribution system that features a single edge router 310 and redundancy only through the edge router input. Edge router 310 accepts both streams 142, and provides output stream 312 to network 320. Network 320 provides stream 322 to access concentrator 330. Streams 312 and 322 include the information supplied by both streams 142. In this configuration, stream fault detection and failover are performed by access concentrator 330. This configuration is otherwise equivalent to that of FIG. 2.

Figure 4:
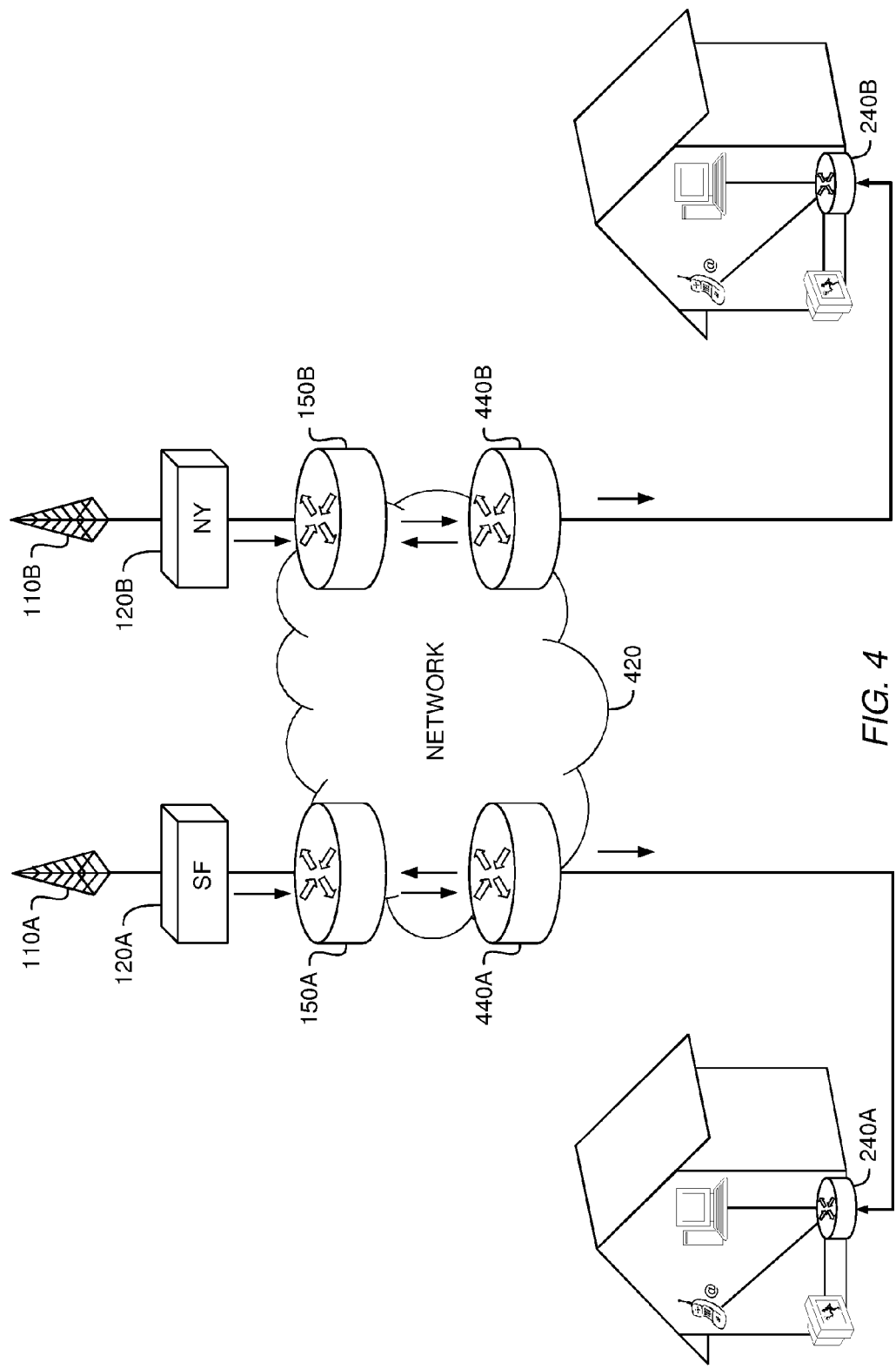
FIG. 4 illustrates an Anycast network scenario.

FIG. 4 shows a configuration for distributing broadcast video over an open network such as the Internet. Antennas 110 are placed in disparate locations, e.g., in San Francisco (SF) and New York City (NY). Each antenna 110 connects to an encoder 120 and an edge router 150. Encoders 120 may supply the same or a different plurality of multicast streams to edge routers 150. Edge routers 150 deliver corresponding multicast streams into network 420. Each edge router 440 recovers a multicast stream that is directed to CPE/RG devices 240. To accomplish this, edge routers 150 utilize the Internet Group Management Protocol (IGMP). IGMP enables an Internet computer or other device to report its multicast group membership to adjacent routers based on the concept of multicasting. Multicasting allows one computer or device connected to an open network to send content to multiple other computers or devices that have identified themselves as being interested in receiving the originating computer's information. Thus, multicasting is generally useful in streaming content to an audience that has "tuned in" by setting up a multicast group membership. A discussion of this can be found in W. Fenner, Network Working Group, Request for Comments (RFC) 2236, Xerox PARC, November 1997, which is incorporated by reference herein.

Edge routers 440 are capable of stream fault detection and failover to the redundant stream. According to one embodiment, when edge router 440a detects a stream failure, it broadcasts an IGMP join request that propagates through network 420. The join request is then acknowledged by the closest source that can replicate the stream to edge router 440a. In this configuration, failover requires more time versus configurations having closed networks, since a larger topology is involved.

Practitioners skilled in the networking and multicasting arts will appreciate that the principles described above may be applied to a variety of broadcast video distribution system configurations not explicitly described herein. For example, a single encoder and redundant edge routers may be utilized with a closed network, and IGMP may be applied to systems utilizing closed networks.

Signaling for Broadcast Video Distribution

Figure 5:
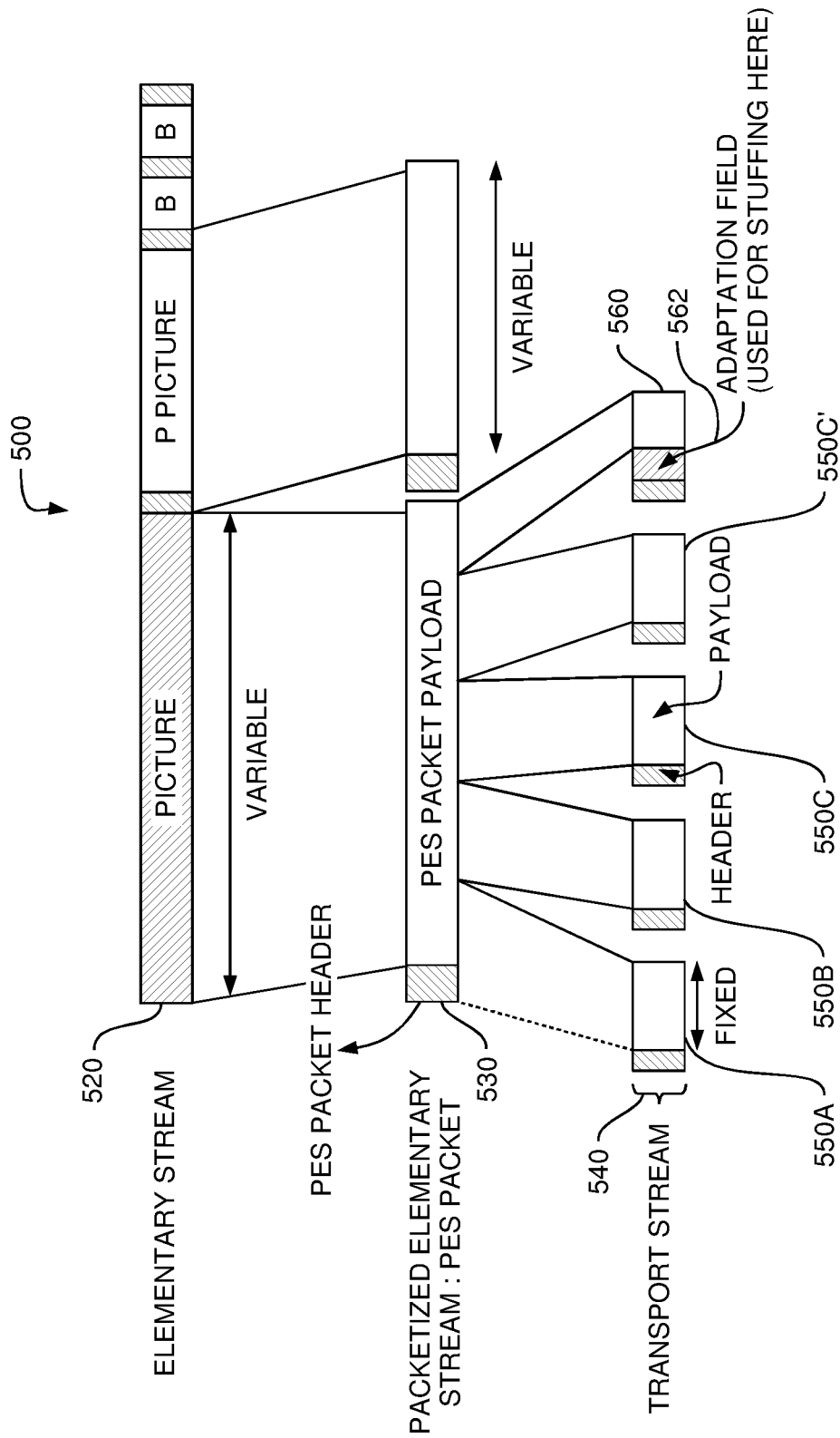
FIG. 5 illustrates concepts of information streams applicable to broadcast video systems.

FIG. 5 illustrates a method of motion picture digital encoding according to the Moving Picture Experts Group (MPEG). Motion video is digitized and formulated into a continuous Elementary Stream (ES) 520 comprising a periodic sequence of I, P and B frames. The I frames are independently reconstructed, while the P frames are forward predicted from the last I frame or P frame. The B frames are forward predicted and backward predicted from the last and next I and P frames. The lengths of the I, P and B frames are variable, depending on the desired quality of the reconstructed video and other factors. Techniques of MPEG video encoding are well known in the art and need not be further elaborated herein.

The Elementary Stream is translated into a Packetized Elementary Stream (PES) 530. Each PES packet is comprised of a header and a payload. The payloads comprise the I, P and B frames of the ES. Accordingly, the PES packet lengths are variable as well. PES 530 is in turn translated into a Transport Stream (TS) 540 comprised of 188-byte (i.e., fixed-length) packets. Each TS packet comprises a header and a payload. Groups of seven consecutive TS packets are each grouped into a single UDP packet (not shown) according to the universal datagram protocol. As will be described below, in addition to carrying video content, the TS packets comprise audio content and control-related information within streams 132. Each video-related UDP packet includes a multicast group address, as referred to above by the designation "G."

As shown in FIG. 5, the payloads of certain TS packets 550 comprise header and payload bits from PES stream 530. The payloads of other TS packets 560 further comprise an Adaptation Field 562. Adaptation Field 562 may range in length from 8 to 64 bits, according to FIG. 6, which is taken from the ITU-T REC H.222.0 (2000 E) specification, which is incorporated by reference herein. Adaptation Field 562 includes a Program Clock Reference flag (PCR_flag) bit 610, which, if set, indicates that the adaptation field includes additional PCR bits 620. Normally, a set PCR_flag bit will occur nominally 10 to 30 times per second, with a specified tolerance of +/−500 ns. However, where a multicast stream fault occurs, the PCR_flag bits will be mistimed or altogether absent.

Multicast Stream Fault Detection in Broadcast Video Systems

Figure 7A:
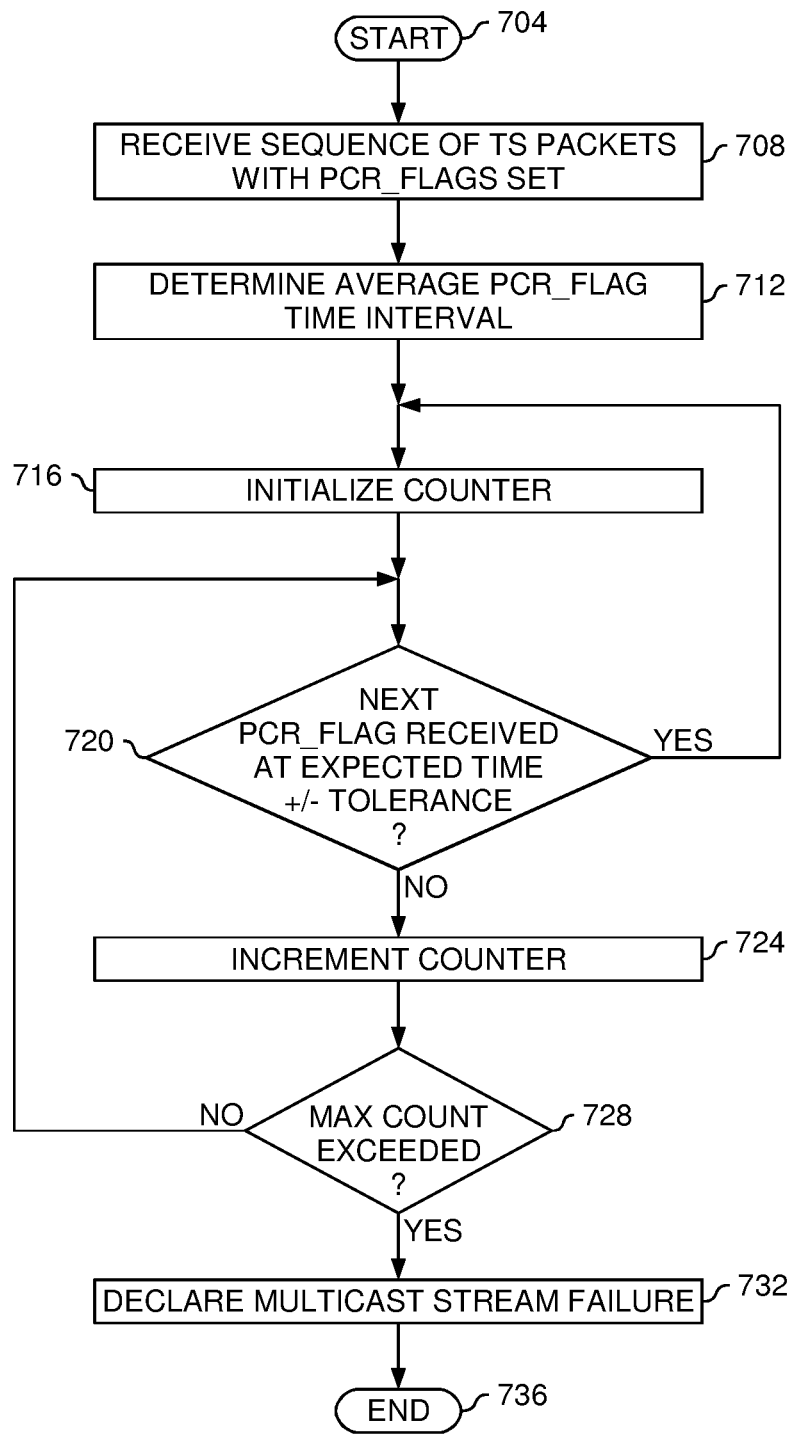
FIG. 7a illustrates one method of detecting a stream failure according to one embodiment of the present invention.

In one aspect, the present invention provides a method of multicast stream fault detection. This method comprises monitoring the timing of observed PCR_flags and declaring a fault condition when a predetermined degree of irregularity is exceeded. According to one embodiment, as shown in FIG. 7a, a sequence of TS packets corresponding to a given multicast stream 132 is monitored 708 for a predetermined period. Following this period, the average PCR_flag interval is determined 712. A counter is next initialized 716. The time interval between the next- and previously-observed PCR_flags is determined and compared to the average PCR_flag interval 720. If the difference does not exceed a predetermined tolerance, the counter is again initialized 716. Otherwise, the counter is incremented 724 and compared against a maximum count 728. If the maximum count is exceeded, a multicast stream failure is declared 732. If the maximum count is not exceeded, step 720 and either step 716 or steps 724 and 728 are repeated for successive PCR_flags. In any event, when the maximum count is exceeded 728, a multicast stream failure is declared 732. This embodiment is effective at detecting delayed or missing PCR_flags.

Figure 7B:
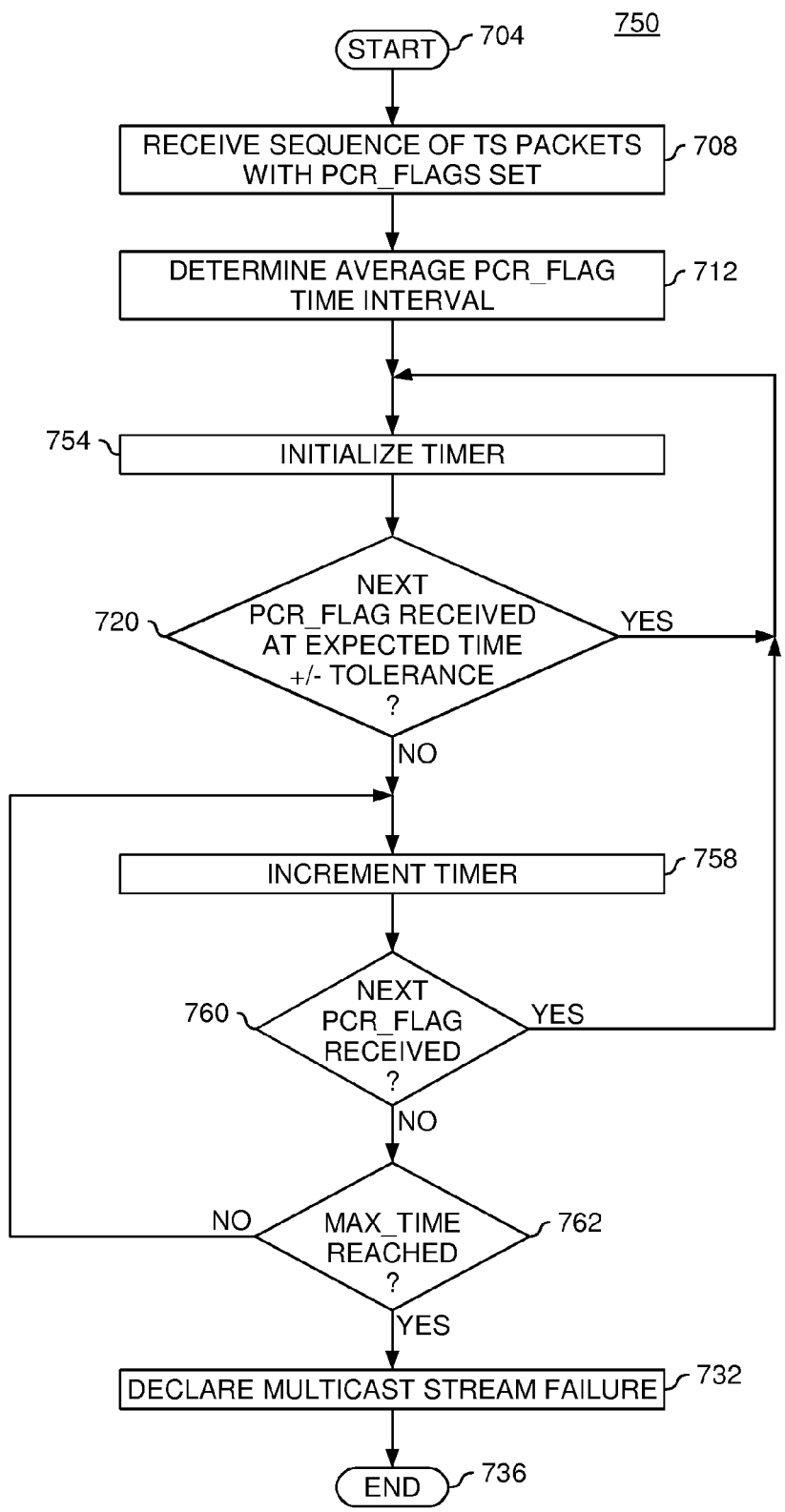
FIG. 7b illustrates another method of detecting a stream failure according to another embodiment of the present invention.

According to another embodiment of the present invention, a timer measures the time between consecutive PCR_flags, as shown in FIG. 7b. Steps 708 and 712 are as described above in connection with FIG. 7a. A timer is next initialized 754. If the next PCR_flag is observed at the expected time plus or minus a tolerance 720, the timer is again initialized 754. Otherwise, the timer increments 758. If the next PCR_flag is then observed, the timer is again initialized 754. If not, then if a timeout max_time is reached 762 a multicast stream fault condition is declared 732. Otherwise, the timer again increments 758. This embodiment is effective at detecting complete multistream failure.

A method of multicast stream failure detection according to another embodiment of the present invention involves a more general monitoring of TS packets in a multicast stream, including video, audio and control TS packets, and including TS packets that do not have adaptation fields. Referring now to FIG. 9a, a method of encoding video, audio and control information/signals 910a, 910b and 910c, respectively, is shown. Signals 910 may, for example, correspond to a particular program/channel, and may be analog or digital waveforms. Encoders 920 receive signals 910 and encode them into TS packet streams 922. Multiplexer 940 receives TS packet streams 922 and translates them into a UDP packet stream 942. Encoders 920 and multiplexer 940 may, for example, be components of encoders 130.

The format of UDP packet stream 942 is shown in FIG. 9b. Each UDP packet comprises a header 960 and a payload 962. Payload 962 is in turn comprised of a sequence of TS packets 970, which represent TS packet streams 922. Each TS packet 970 includes a header 972 that comprises a program identifier (PID). During the encoding and multiplexing processes additional data, known as service information, is encoded within and describes the structure of UDP packet stream 942. Service information commonly found within UDP packet stream 942 includes the Program Map Table (PMT), which contains the PID for each of the channels associated with a particular program and tells the client receiver which stream contains the PCR for the service; the Network Information Table (NIT), which uniquely identifies the network that is transmitting the transport stream and describes some of the physical properties of the network (e.g., channel frequencies); the Program Association Table (PAT), which contains a complete list of all programs in the transport stream along with the PID for the PMT for program as well as the NIT for the transport stream; and the Conditional Access Table (CAT), which specifies the conditional assess or scrambling systems in use in the transport stream and includes information on how to decode them. Collectively, the PMT, NIT, PAT and CAT are referred to as Program Specific Information (PSI). PSI provides information that enables automatic configuration of downstream receiving equipment in order to demultiplex and decode the various streams of programs.

As shown in FIG. 9c, the PID specifies whether the corresponding TS packet carries video, audio or control information. The notation "x, y, z" in FIG. 9c refers to the respective PID codes. FIG. 8 shows the format of TS packet headers 972, within which the PID code 810 comprises 13 bits. In addition, a continuity counter (CC) 820 comprises 4 bits. The CC is a cyclic count that indicates the sequencing of each of the video, audio and control TS packet streams 922/970. PSI that defines the PIDs assigned to audio and video is included in the PMT, which in turn is included in a control PID having the format 0x00.

Figure 10:
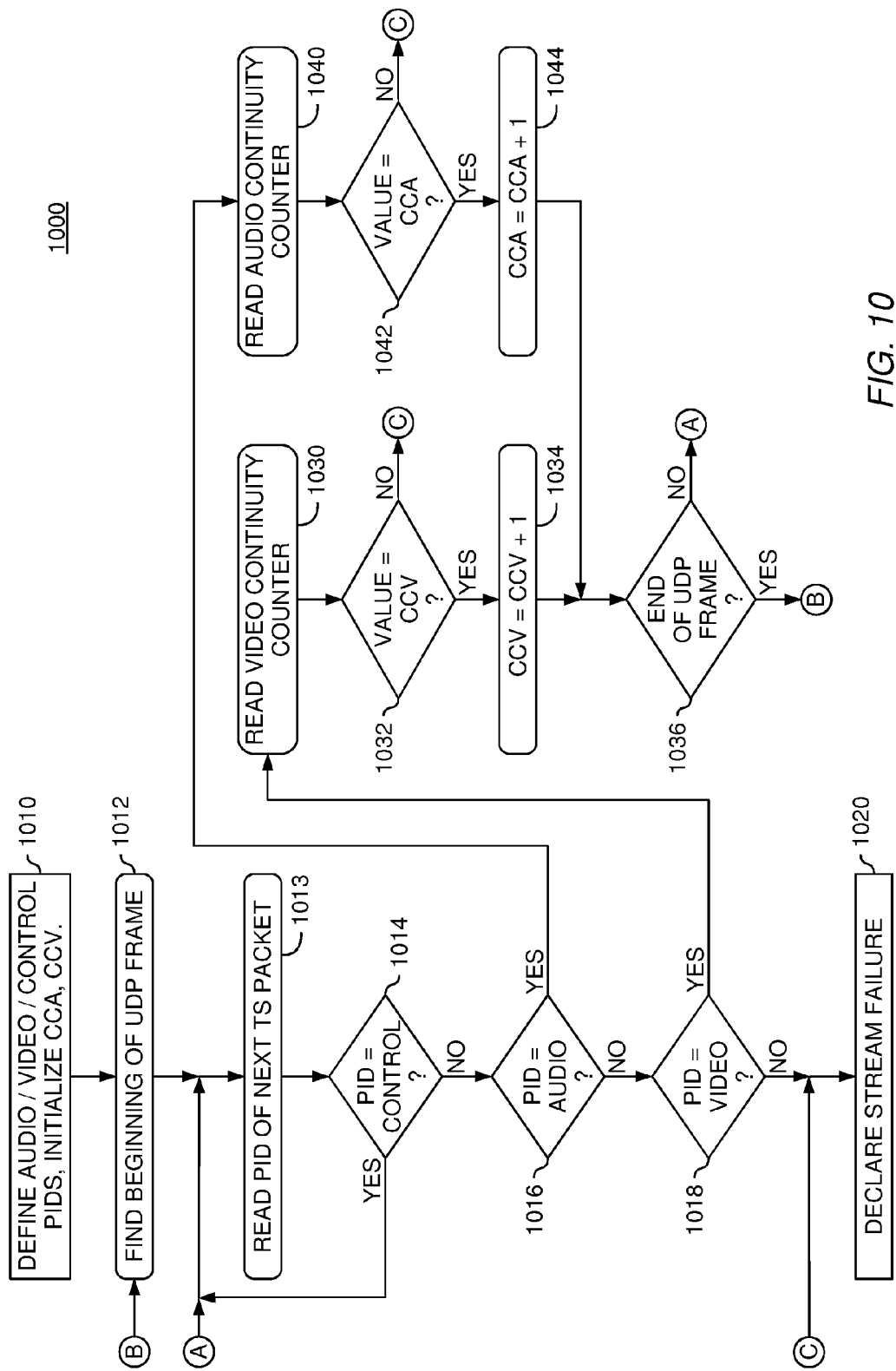
FIG. 10 illustrates a method detecting a stream failure according to another embodiment of the present invention.

A method of multicast stream failure detection according to another embodiment of the present invention involves monitoring the PID and CC information, as shown in FIG. 10. The method first defines, e.g., learns, the pertinent video and audio PIDs 1010 from the control PID and associated PAT/PMT information and also initializes 1010 two counters, CCv and CCa. These counters are initialized to the video and audio CCs, respectively, expected within the TS packets that occur at the start of a UDP frame. The method next monitors UDP stream 942 and finds the beginning of the next UDP frame 1012. The PID of the next observed TS packet is determined 1013, and is tested 1014 to determine whether it is a control PID. If so, execution returns to step 1013. Otherwise, the PID is tested to determine whether it represents audio 1016. If so, the CC within the TS header is read 1040 and compared to CCa 1042. If there is not a match, a multicast stream failure condition is declared 1020. Otherwise, counter CCa is incremented 1044. A test is then performed 1036 to determine whether the end of the UDP frame has been reached. If so, execution returns to step 1012. Otherwise, execution returns to step 1013.

If an audio PID was not recognized 1016, the PID is tested to determine whether it is a video PID 1018. If so, execution passes to steps 1030 through 1034, which are analogous to steps 1040 through 1044 as described above. Execution then passes to step 1036 as described above.

If none of a control, audio or video PID was recognized in steps 1014, 1016 and 1018, a stream failure condition is declared 1020.

Seamsless Failover from Primary to Redundant Streams

Figure 11:
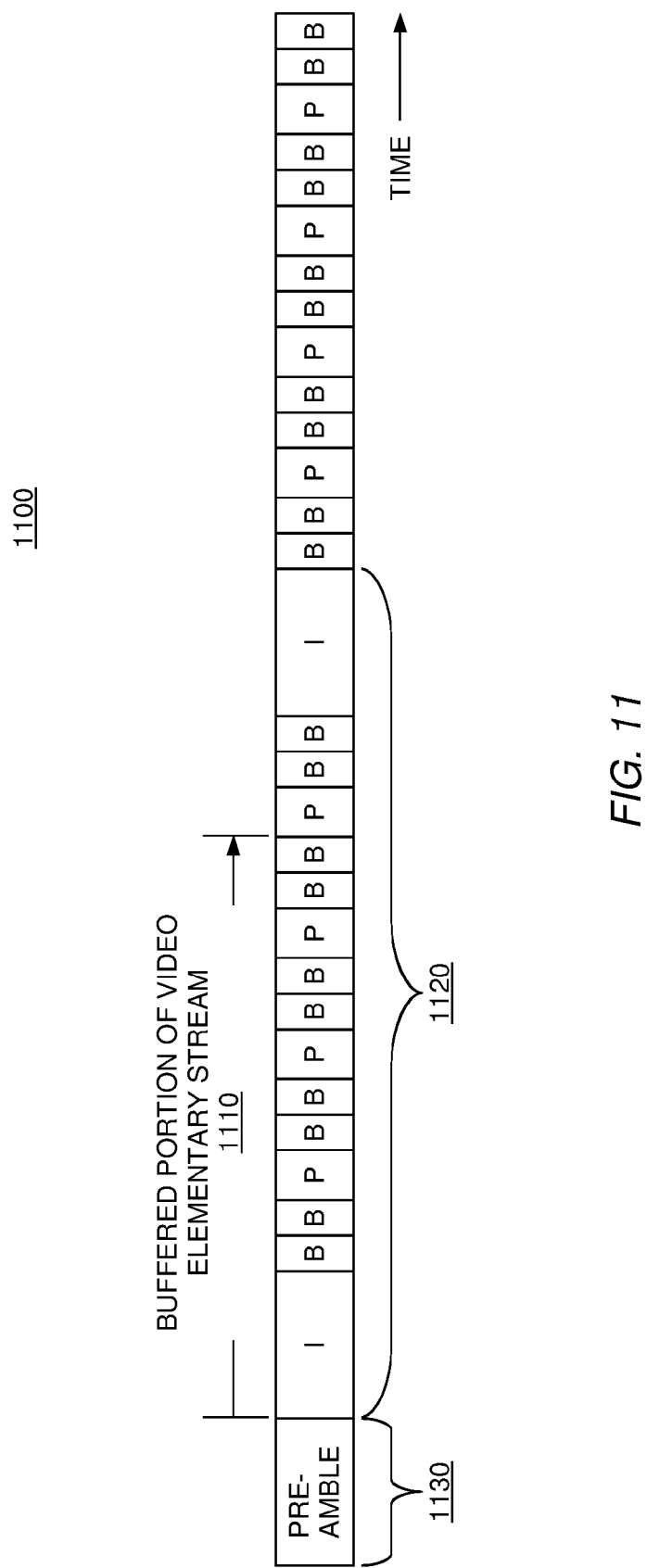
FIG. 11 illustrates a method of buffering a recovered video elementary stream according to another embodiment of the present invention.

In another aspect, the present invention provides seamless failover from a primary to a redundant stream. That is, failover is accomplished with minimal or no discernable disruption to the viewer of the video program. This method is applicable to video broadcast systems having closed networks, such as those corresponding to FIGS. 2 and 3 and described above. The topologies of these networks may introduce different transmission delays over the primary and redundant paths. For example, the transmission lines corresponding to primary and redundant feeds 142a/b may of different lengths, resulting in a differential delay at the inputs of edge routers 150 or edge router 310. Absent mitigation, such differential delay, combined with switching and other potential delays, may result in an undesirable disruption apparent to the viewer of a video broadcast program upon failover. Now referring to FIG. 11, a VES 1100 recovered from a redundant multicast stream is depicted. VES 1100 may be produced by, for example, edge router 150b, access concentrator 230 (if both streams 222 are normally active), edge router 310, or access concentrator 330. Prior to a multicast stream failure, a most recent portion 1110 of the VES produced from the redundant stream is saved in a buffer. More specifically, portion 1110 spans the start of the most recent I frame to the I-, B- or P-frame recovered from the redundant multicast stream just prior to failover. Prior to failover, when a portion 1120 of the VES spanning two consecutive complete I-frames has been buffered, the buffer "dumps" the least recent portion of its contents up to the beginning of the most recent I-frame. The buffering process then repeats until failover occurs.

Upon failover, the buffered VES information is communicated to the receiving equipment such as television/set-top box 242 where it is prepended to the received VES. A complete set of I, B and P frames (referred to as a "group of picture frames" or GOP) is thereby spliced together within the receiving equipment. The video decoder within the receiving equipment then reconstructs the video signal from this GOP. Optionally, program parameters specific to the redundant multicast stream are saved in an initial portion 1130 of the buffer. The buffer may reside in any component of a video broadcast network that has access to both the primary and redundant streams. For example, in system 200, wherein both streams 222 are active prior to multicast stream failure, the buffer may reside in access concentrator 230.

Advantageously, this seamless failover methodology minimizes or eliminates the disruption apparent to the viewer following a failover. For example, according to one embodiment, video information is transmitted at the rate of 30 I/B/P frames per second and 15 frames per GOP, or 2 GOPs per second. Without applying the method described above, upon failover a portion or all of a GOP could be lost. The nature of the digital video decompression and reconstruction is such that a partial GOP cannot be utilized. As a consequence, a viewer could observe a "blackout" or other video disruption that would persist until the next full I frame could be processed. In the present example, the duration of the disruption could equal the duration of one GOP, or 0.5 second.

Figure 12:
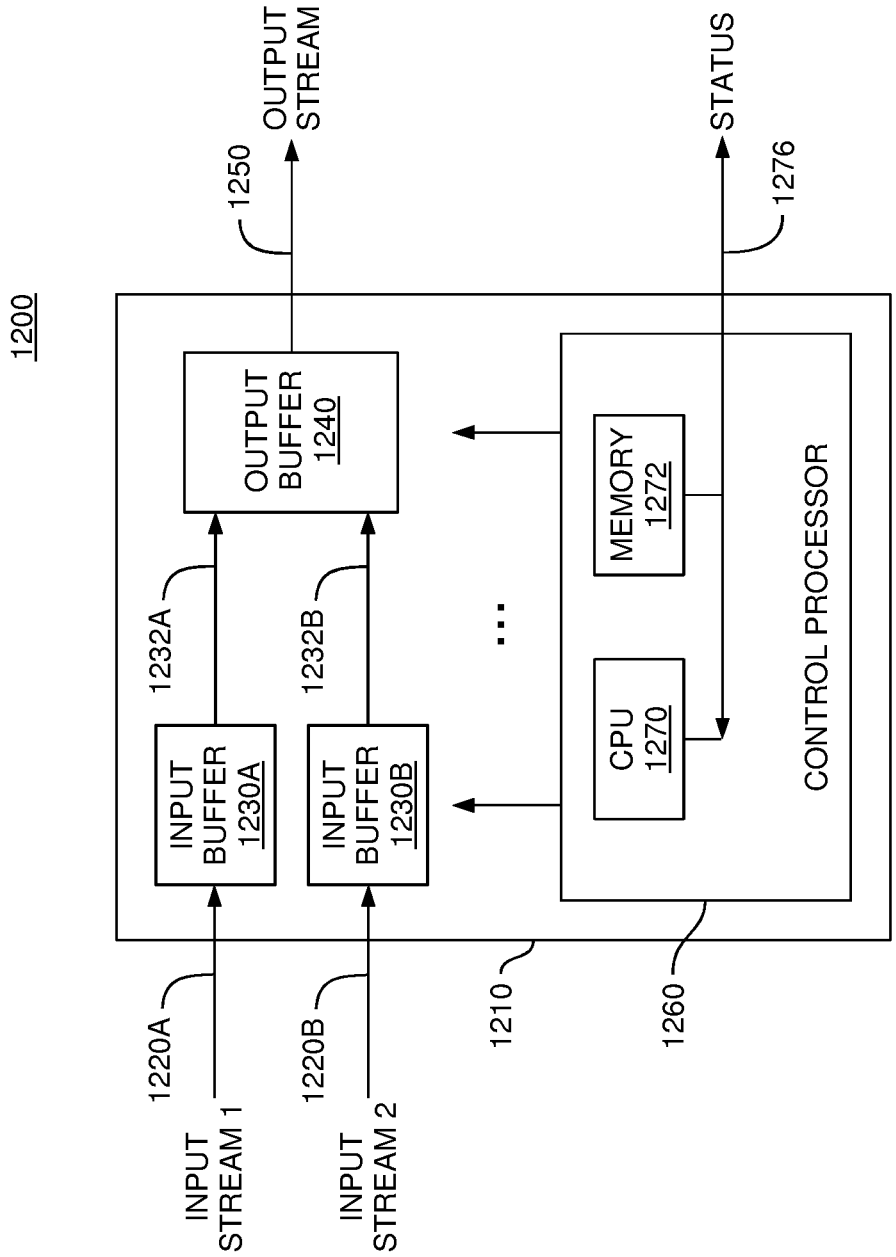
FIG. 12 is a block diagram of a network device according to one embodiment of the present invention.

Now referring to FIG. 12, a block diagram 1200 of a network device 1210 is depicted according to one embodiment of the present invention. Network device 1210 may normally receive two simultaneously active input streams 1220 and perform a seamless switchover in the event that one input stream fails. Alternately, network device 1210 may normally receive only one active input stream 1220, and may perform a switchover when the normally active stream fails and the redundant stream becomes active. Input buffers 1230 buffer the video TS packets incoming on lines 1220. Lines 1220 correspond to any pair of primary and redundant streams received by a network device. Input buffers 1230 may include multiple circular or dynamic sliding window buffers, or other types of buffers. Each such buffer caches the TS packets of multicast programs. In a typical implementation, input buffers 1230 can accommodate hundreds of multicast programs and store one or more seconds of video data per program. The outputs 1232 of input buffers 1230 are fed to an output buffer 1240. Output buffer 1240 performs switching and splicing functions, and provides stream 1250 to downstream devices within the digital broadcast video distribution system.

Network device 1210 includes a control processor 1260, which orchestrates aspects of the multicast stream fault detection and switchover methods described above. Control processor 1260 includes a central processing unit (CPU) 1270 coupled to a memory 1272 via bus 1276. In one embodiment, software or firmware running on CPU 1270 orchestrates aspects of the functionality of multicast stream fault detection and switchover discussed above. For example, upon failure of an input stream 1220, CPU 1270 may inform output buffer 1240 to switch from the outputs of one input buffer 1230 to the outputs of the other input buffer 1230, and to assemble GOPs as required using buffered TS packets. Bus 1276 may provide status as needed externally, e.g., to report occurrence of a multicast stream fault. Bus 1276 may also accept parameters such as those related to the multicast stream fault detection methods discussed above from external sources.

Persons skilled in the art will appreciate that a variety of implementations of network device 1210 that provide equivalent functionality are possible. For example, control processor 1260 may comprise any combination of programmable or specialized circuitry. Furthermore, the control functionality of network device 1210 may be distributed among input and output buffers 1230 and 1240 and control processor 1260.

The present invention is well suited to a wide variety video broadcast network topologies, including but not limited to the specific topologies discussed herein. It is to be further appreciated that the digital video elementary format employed in the system and method of the present invention is not limited to MPEG-2, but may also include MPEG-1, MPEG-4, H.26x and/or any future video compression standards. Furthermore, certain aspects of the present invention are described above in the form of methods or algorithms. It should be noted that such methods or algorithms can be embodied in an apparatus comprising software, firmware, hardware or combinations thereof. This apparatus may be specially constructed for the required purposes, or may comprise generic computing or other processing equipment selectively activated or reconfigured by a program stored on a computer readable medium. Such equipment and media may comprise any type of magnetic or optical disk, read-only memory (ROM), random access memory (RAM), EPROMs, EEPROMs, magnetic or optical cards, custom analog and digital circuitry, programmable control and/or signal processors, application specific integrated circuits (ASICs), field programmable gate arrays (FPGAs) or any type of media suitable for storing electronic instructions.

Advantages of the present invention include effectively detecting individual multicast stream failures at a variety of nodes within broadcast video systems. In addition, a means for failover from a primary to a redundant multicast stream is provided that eliminates or minimizes disruption to the viewer. These aspects accommodate a variety of system architectures, and the corresponding apparatus may be implemented according to a variety of approaches.

Upon reading this disclosure, those of skill in the art will appreciate still additional alternative structural and functional designs for a system and a process for providing fault detection and seamless failover for broadcast video across a digital network. While particular embodiments and applications of the present invention have been described, it is to be understood that the invention is not limited to the precise construction and components disclosed herein. Various modifications which will be apparent to those skilled in the art may be made in the method and apparatus disclosed without departing from the spirit and scope of the invention as defined in the appended claims.

What is claimed is:

1. A computer-implemented method to detect and handle a stream-specific multicast stream fault in a digital broadcast video distribution system including a network device, the computer-implemented method comprising:
    receiving, by the network device, a plurality of video transport stream (TS) packets of a first primary multiplexed multicast stream, at least two of the received TS packets having set program clock reference (PCR) flags, and at least one TS packet of a second primary multiplexed multicast stream;
    determining an average time interval between occurrences of the received video TS packets having set PCR flags;
    receiving a plurality of subsequent video TS packets of the first primary multiplexed multicast stream, at least two of the received subsequent video TS packets having set PCR flags;
    determining a set of time intervals between successive occurrences of the subsequent video TS packets having set PCR flags; and
    upon determining that a first predetermined number of the set of determined time intervals differs from the average time interval by more than a predetermined difference, declaring, by the network device, a multicast stream fault specific to the first primary multiplexed multicast stream by operation of one or more computer processors and without declaring any multicast stream fault specific to the second primary multiplexed multicast stream, wherein the declared multicast stream fault causes designation of a redundant multiplexed multicast stream as a replacement for the first primary multiplexed multicast stream.

2. The computer-implemented method of claim 1, wherein the first predetermined number of the set of determined time intervals is greater than one, wherein the digital broadcast video distribution system includes an edge device operatively connected to an access concentrator, wherein the network device comprises one of the edge device and the access concentrator, wherein the computer-implemented method further comprises:
    upon detecting the declared multicast stream fault specific to the first primary multiplexed multicast stream, designating, by the access concentrator, the redundant multiplexed multicast stream as the replacement for the first primary multiplexed multicast stream and without designating any replacement for the second primary multiplexed multicast stream, thereby providing fault detection and failover specific to the first primary multiplexed multicast stream.

3. The computer-implemented method of claim 1, wherein the set of time intervals comprises a second predetermined number of time intervals, wherein the digital broadcast video distribution system further comprises a packet network, wherein the digital broadcast video distribution system includes an edge device operatively connected to an access concentrator, wherein the network device comprises one of the edge device and the access concentrator, wherein the access concentrator is configured to, upon detecting the multicast stream fault, broadcast an Internet Group Management Protocol (IGMP) join request that propagates through the packet network, wherein the multiplexed multicast stream is selected responsive to broadcasting the IGMP join request.

4. A computer-implemented method to detect and handling a stream-specific multicast stream fault in a digital broadcast video distribution system including a network device, the computer-implemented method comprising:
    receiving, by the network device: (i) a plurality of video transport stream (TS) packets of a first primary multiplexed multicast stream, at least two of the received TS packets having set program clock reference (PCR) flags; and (ii) at least one TS packet of a second primary multiplexed multicast stream;
    determining an average time interval between occurrences of the received video TS packets having set PCR flags;
    waiting a predetermined time following reception of a subsequent TS packet of the first primary multiplexed multicast stream and having a set PCR flag, wherein the predetermined time is a function of the average time interval; and
    upon determining that a next video TS packet having a set PCR flag is not received during the predetermined time, declaring, by the network device, a multicast stream fault specific to the first primary multicast multiplexed stream by operation of one or more computer processors and without declaring any multicast stream fault specific to the second primary multiplexed multicast stream, wherein the declared multicast stream fault causes designation of a redundant multiplexed multicast stream as a replacement for the first primary multiplexed multicast stream.

5. An apparatus to detect and handle a stream-specific multicast stream fault in a digital broadcast video distribution system, the apparatus operatively connected to a network device and comprising:
   an input buffer configured to:
      receive a plurality of video transport stream (TS) packets of a first primary multiplexed multicast stream, at least two of the received TS packets having set program clock reference (PCR) flags; and (ii) at least one TS packet of a second primary multiplexed multicast stream; and
      receive a plurality of subsequent video TS packets of the first primary multiplexed multicast stream, at least two of the received subsequent video TS packets having set PCR flags; and
   a control processor, configured to communicate with the input buffer and:
      determine an average time interval between occurrences of the plurality of received video TS packets having set PCR flags;
      determine a set of time intervals between successive occurrences of the subsequent video TS packets having set PCR flags; and
      upon determining that a predetermined number of the set of determined time intervals differs from the average time interval by more than a predetermined difference, declaring a multicast stream fault specific to the first primary multicast multiplexed stream and without declaring any multicast stream fault specific to the second primary multiplexed multicast stream, wherein the declared multicast stream fault causes designation of a redundant multiplexed multicast stream as a replacement for the first primary multiplexed multicast stream.

6. The apparatus of claim 5, wherein the digital broadcast video distribution system comprises a plurality of redundant edge devices and an intercommunication link between a first and a second edge device, each edge device accepting a multiplexed multicast stream, wherein the multicast stream fault is detected by the first edge device and communicated to the second edge device via the intercommunication link, wherein the first edge device comprises the apparatus, wherein the network device comprises an access concentrator.

7. The apparatus of claim 6, wherein the digital broadcast video distribution system further comprises:
   a plurality of network paths within the packet network, each path corresponding to the output of each edge device, wherein the access concentrator is configured to select one of the plurality of network paths responsive to the declared stream fault.

8. The apparatus of claim 5, wherein the apparatus comprises an edge device configured to accept a plurality of multiplexed multicast streams including the first primary, second primary, and alternate multiplexed multicast streams, and:
   select the first primary multiplexed multicast stream of the plurality of multiplexed multicast streams;
   detect the multicast stream fault on the first primary multiplexed multicast stream; and
   selects the alternate multiplexed multicast stream of the plurality of multiplexed multicast streams responsive to detecting the multicast stream fault.

9. The apparatus of claim 5, wherein the multicast stream fault declaration is forwarded within the digital broadcast video distribution system, wherein the apparatus comprises an access concentrator, wherein the network device comprises an edge device.

10. An apparatus to detect and handle a multicast stream fault in a digital broadcast video distribution system, the apparatus operatively connected to a network device and comprising:
   an input buffer configured to receive: (i) a plurality of video transport stream (TS) packets of a first primary multiplexed multicast stream, at least two of the received TS packets having set program clock reference (PCR) flags; and (ii) at least one TS packet of a second primary multiplexed multicast stream; and
   a control processor, configured to communicate with the input buffer and:
      determine an average time interval between occurrences of the received video TS packets having set PCR flags,
      wait a predetermined time following reception of a subsequent TS packet of the first primary multiplexed multicast stream and having a set PCR flag,
   wherein the predetermined time is a function of the average time interval, and
      upon determining that a next video TS packet having a set PCR flag is not received during the predetermined time, declaring a multicast stream fault specific to the first primary multicast multiplexed stream and without declaring any multicast stream fault specific to the second primary multiplexed multicast stream, wherein the declared multicast stream fault causes designation of a redundant multiplexed multicast stream as a replacement for the first primary multiplexed multicast stream.

11. The apparatus of claim 10, wherein the digital broadcast video distribution system comprises a plurality of redundant edge devices and an intercommunication link between a first and a second edge device, each edge device accepting a multiplexed multicast stream, wherein the multicast stream fault is detected by the first edge device and communicated to the second edge device via the intercommunication link, wherein the first edge device comprises the apparatus, wherein the network device comprises an access concentrator.

12. The apparatus of claim 11, wherein the digital broadcast video distribution system further comprises:
   a plurality of network paths within the packet network, each path corresponding to the output of each edge device, wherein the access concentrator is configured to select one of the plurality of network paths responsive to the declared stream fault.

13. The apparatus of claim 10, wherein the apparatus comprises an edge device configured to accepts a plurality of multiplexed multicast streams including the first primary, second primary, and alternate multiplexed multicast streams, and:
   select the first primary multiplexed multicast stream of the plurality of multiplexed multicast streams;
   detects the multicast stream fault on the first primary multiplexed multicast stream; and
   selects the alternate multiplexed multicast stream of the plurality of multiplexed multicast streams responsive to detecting the multicast stream fault.

14. The apparatus of claim 10, wherein the multicast stream fault declaration is forwarded within the digital broadcast video distribution system, wherein the apparatus comprises an access concentrator, wherein the network device comprises an edge device.

15. An apparatus to detect and handle a multicast stream fault in a digital broadcast video distribution system, the apparatus operatively connected to a network device and comprising:
   an input buffer configured to:
      receive: (i) a first transport stream (TS) packet of a first primary multiplexed multicast stream and having a program identifier (PID) that is one of a video or an audio PID; and (ii) at least one TS packet of a second primary multiplexed multicast stream; and
      receive a next TS packet of the first primary multiplexed multicast stream and whose PID is the same as that of the first TS packet; and
   a control processor, configured to communicate with the input buffer and:
      determine a continuity counter (CC) of the first TS packet, determine whether the CC of the next TS packet is incrementally greater than the CC of the first TS packet, and
      upon determining that the CC of the next TS packet is not incrementally greater than the CC of the first TS packet, declaring a multicast stream fault specific to the first primary multicast multiplexed stream and without declaring any multicast stream fault specific to the second primary multiplexed multicast stream, wherein the declared multicast stream fault causes designation of a redundant multiplexed multicast stream as a replacement for the first primary multiplexed multicast stream.

16. The apparatus of claim 15, wherein the input buffer is further configured to determine the PID from one of a Program Map Table and a Program Association Table.

17. The apparatus of claim 15, wherein the digital broadcast video distribution system comprises a plurality of redundant edge devices and an intercommunication link between a first and a second edge device, each edge device accepting a multiplexed multicast stream, wherein the multicast stream fault is detected by the first edge device and communicated to the second edge device via the intercommunication link, wherein the first edge device comprises the apparatus, wherein the network device comprises an access concentrator.

18. The apparatus of claim 17, wherein the digital broadcast video distribution system further comprises:
   a plurality of network paths within the packet network, each path corresponding to the output of each edge device, wherein the access concentrator is configured to selects one of the plurality of network paths responsive to the declared stream fault.

19. The apparatus of claim 15, wherein the apparatus comprises an edge device configured to accepts a plurality of multiplexed multicast streams including the first primary, second primary, and alternate multiplexed multicast streams, and:
   select the first primary multiplexed multicast stream of the plurality of multiplexed multicast streams;
   detects the multicast stream fault on the first primary multiplexed multicast stream; and
   select the alternate multiplexed multicast stream of the plurality of multiplexed multicast streams responsive to detecting the multicast stream fault.

20. The apparatus of claim 15, wherein the multicast stream fault declaration is forwarded within the digital broadcast video distribution system, wherein the apparatus comprises an access concentrator, wherein the network device comprises an edge device.

* * * * *

UNITED STATES PATENT AND TRADEMARK OFFICE
CERTIFICATE OF CORRECTION

PATENT NO. : 8,854,948 B2  Page 1 of 1
APPLICATION NO. : 12/904240
DATED : October 7, 2014
INVENTOR(S) : Pereira et al.

It is certified that error appears in the above-identified patent and that said Letters Patent is hereby corrected as shown below:

In the Claims:

Column 11, Claim 8, Line 65, please delete "selects" and insert -- select -- therefor;

Column 12, Claim 13, Line 55, please delete "accepts" and insert -- accept -- therefor;

Column 12, Claim 13, Line 61, please delete "detects" and insert -- detect -- therefor;

Column 12, Claim 13, Line 63, please delete "selects" and insert -- select -- therefor;

Column 14, Claim 18, Line 16, please delete "selects" and insert -- select -- therefor;

Column 14, Claim 19, Line 19, please delete "accepts" and insert -- accept -- therefor;

Column 14, Claim 19, Line 25, please delete "detects" and insert -- detect -- therefor.

Signed and Sealed this
Tenth Day of March, 2015

Michelle K. Lee
*Deputy Director of the United States Patent and Trademark Office*